United States Patent
Watanabe

(10) Patent No.: US 6,920,544 B2
(45) Date of Patent: Jul. 19, 2005

(54) PROCESSOR AND INSTRUCTION EXECUTION METHOD WITH REDUCED ADDRESS INFORMATION

(75) Inventor: Mototsugu Watanabe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 236 days.

(21) Appl. No.: 10/395,849

(22) Filed: Mar. 25, 2003

(65) Prior Publication Data

US 2004/0049656 A1 Mar. 11, 2004

(30) Foreign Application Priority Data

Mar. 26, 2002 (JP) .......................................... 2002-085423

(51) Int. Cl.⁷ .............................................. G06F 12/00
(52) U.S. Cl. ....................... 711/217; 711/218; 712/200; 712/206; 712/215
(58) Field of Search ............................... 711/217, 218; 712/200, 206, 215

(56) References Cited

U.S. PATENT DOCUMENTS 5,790,564 A * 8/1998 Adams et al. ............... 714/738
5,983,289 A * 11/1999 Ishikawa et al. ............. 710/35
6,538,938 B2 * 3/2003 Fister .......................... 365/201

* cited by examiner

Primary Examiner—Donald Sparks
Assistant Examiner—Ngoc Dinh
(74) Attorney, Agent, or Firm—Rabin & Berdo, P.C.

(57) ABSTRACT

A processor includes a memory unit in which instructions having their constituent bytes stored in ascending address order alternate with instructions having their constituent bytes stored in descending address order. A single address pointer is used to read one instruction by reading up, and another instruction by reading down. The amount of address information needed for program execution is thereby reduced, as one address pointer suffices for two instructions. The address pointer may be provided by a branch instruction that also indicates whether to read up or down. An up-counter and a down-counter may be provided as address counters, enabling the two instructions to be read and executed concurrently. Four address counters may be provided, enabling a branch instruction to designate the execution of from one to four consecutive instructions.

10 Claims, 13 Drawing Sheets

PROCESSOR AND INSTRUCTION EXECUTION METHOD WITH REDUCED ADDRESS INFORMATION

BACKGROUND OF THE INVENTION

1. Field of the Invention

This invention relates to a processor, and especially to its architecture and its method of executing instructions. In particular, the invention relates to a processor that reads a multiple-byte instruction a byte at a time from a memory, assembles the bytes in a register, and then decodes and executes the instruction.

2. Description of the Related Art

In this type of processor, instructions are generally stored at ascending addresses as illustrated in FIG. 13, in which instruction i1 is stored at addresses j, j+1, j+2, and j+3, instruction i2 at addresses j+4, j+5, j+6, and j+7, and so on. When an instruction is read, its leading byte is indicated by an address pointer, and the succeeding bytes are indicated by an address counter. The bytes constituting the instruction are read sequentially into corresponding byte positions in an instruction register having sufficient capacity to store the entire instruction. When all bytes of the instructions have been read into the instruction register, the instruction is supplied to an instruction decoder and executed. When one instruction has been executed, the address pointer is altered to point to the leading byte of the next instruction, and the same process is repeated.

A problem with this procedure is that each time an instruction is executed, a new address pointer value must be generated, indicating the address of its leading byte. To execute a program including a large number of instructions, a large amount of address information is needed.

In some processors, a plurality of instructions are executed concurrently, but this requires a like plurality of address pointers, so the amount of information needed to execute a program is not reduced.

SUMMARY OF THE INVENTION

An object of the present invention is to provide a processor that requires less information to execute a program.

The invented processor includes a memory unit, a controller, and at least one address counter.

In one aspect of the invention, the memory unit stores a plurality of instructions, each instruction having a plurality of constituent bytes, which are stored at consecutive addresses. The leading constituent bytes of a first instruction and a second instruction are stored at mutually adjacent addresses. The other constituent bytes of the first instruction are stored in descending address order; the other constituent bytes of the second instruction are stored in ascending address order.

The controller initializes the address counter according to an address pointer pointing to the leading constituent byte of the first or second instruction, and directs the address counter to count up or down. When the controller directs the address counter to count down, the constituent bytes of the first instruction are read from the memory unit, and the first instruction is executed. When the controller directs the address counter to count up, the constituent bytes of the second instruction are read, and the second instruction is executed.

This aspect of the invention also provides an instruction execution method in which the address pointer is supplied by a branch instruction. The branch instruction includes direction information indicating whether to count down, thereby branching to the first instruction, or count up, thereby branching to the second instruction.

In another aspect of the invention, the processor has a first address counter that counts down, and a second address counter that counts up. The two address counters are both initialized according to the same address pointer. First and second instructions are stored in the memory unit as described above, with their leading bytes mutually adjacent. The first address counter is used to read the constituent bytes of the first instruction; the second address counter is used to read the constituent bytes of the second instruction.

The processor may also include a first instruction register into which the constituent bytes of the first instruction are read, a second instruction register into which the constituent bytes of the second instruction are read, a first decoder for decoding and executing the instruction stored in the first instruction register, and a second decoder for decoding and executing the instruction stored in the second instruction register. The first and second instructions can then be executed concurrently. One or both of the first and second instructions may include information indicating whether concurrent processing is possible, and the controller may use this information to decide whether to have the first and second instructions executed serially or concurrently.

Alternatively, the processor may have a selector for selecting the first or second instruction register, and a single decoder for decoding and executing the instruction stored in the selected instruction register.

In yet another aspect of the invention, the processor has a first address counter that counts up, a second address counter that counts down, a third address counter that counts up, and a fourth address counter that counts down. In the memory unit, a point instruction is followed by a first instruction having its constituent bytes stored in ascending address order, a second instruction having its constituent bytes stored in descending address order, a third instruction having its constituent bytes stored in ascending address order, and a fourth instruction having its constituent bytes stored in descending address order. Thus the leading bytes of the second and third instructions are stored at mutually adjacent addresses. A main address pointer points to the point instruction. The point instruction includes a first internal address pointer pointing to the leading byte of the second or third instruction, and a second internal address pointer pointing to the leading byte of the fourth instruction. The first address counter is initialized according to the main address pointer. The second and third address counters are initialized according to the first internal address pointer. The fourth address counter is initialized according to the second internal address pointer. The first, second, third, and fourth address counters are used to read the constituent bytes of the first, second, third, and fourth instructions, respectively.

This aspect of the invention provides an instruction execution method in which the main address pointer is supplied by a branch instruction. The branch instruction also supplies distance and direction information. At least one of the first through fourth instructions is executed according to the main address pointer, distance information, and direction information. For example, the first through fourth instructions may all be executed if the distance information indicates the leading byte of the first instruction; the second through fourth instructions may be executed if the distance information indicates the leading byte of the second or third instruction and the direction information indicates down; the third and fourth instructions may be executed if the distance information indicates the leading byte of the second or third instruction and the direction information indicates up; and the fourth instruction alone may be executed if the distance information indicates the leading byte of the fourth instruction.

DETAILED DESCRIPTION OF THE INVENTION

Figure 1:
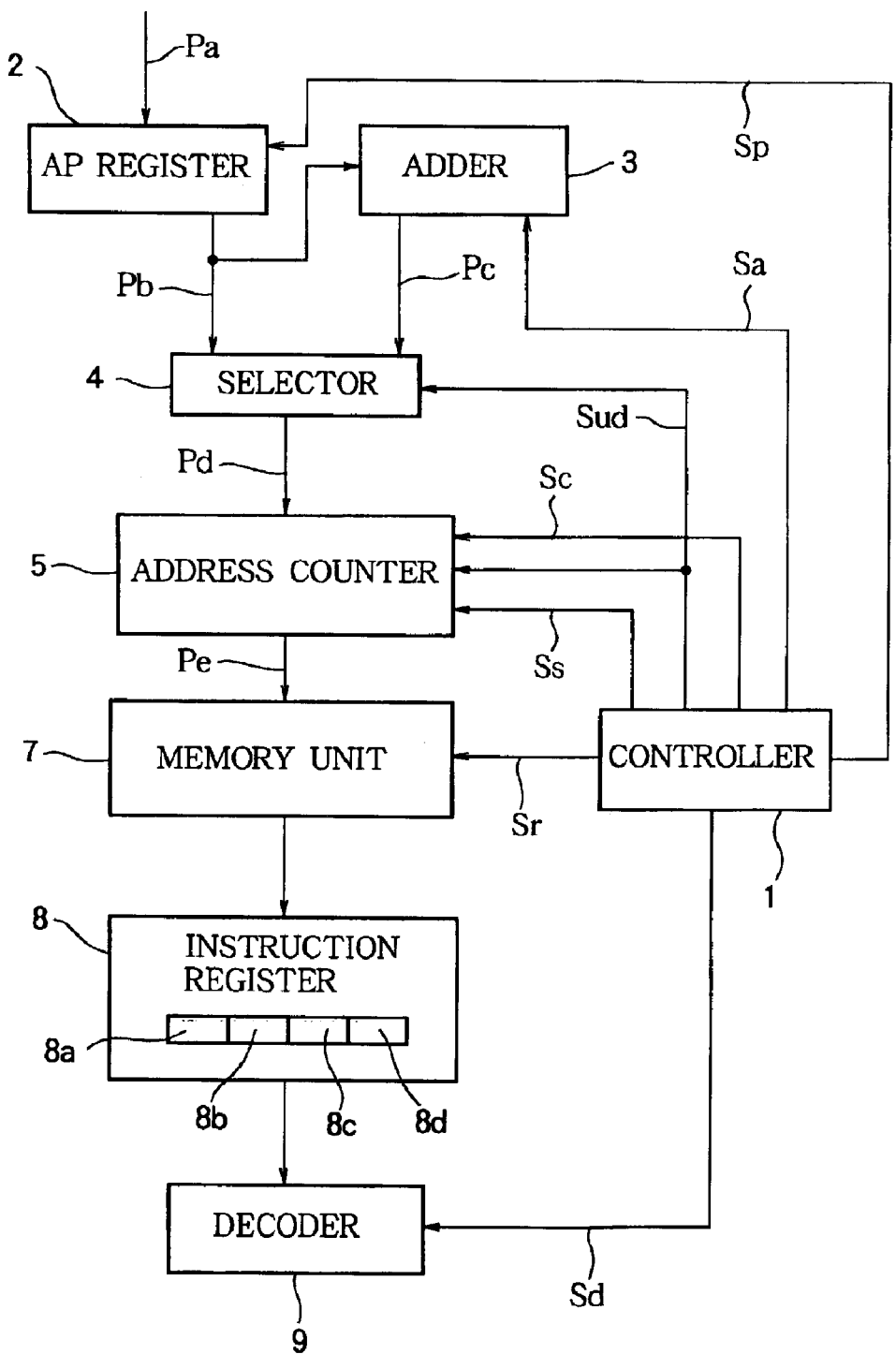
FIG. 1 is a block diagram showing a processor according to a first embodiment of the present invention.

Embodiments of the invention will now be described with reference to the attached drawings, in which like elements are indicated by like reference characters.

First Embodiment

Referring to FIG. 1, the processor in the first embodiment comprises a controller 1, an address pointer register (AP register) 2, an adder 3, a selector 4, an address counter 5, a memory unit 7, an instruction register 8, and a decoder 9.

As will be explained below, the controller 1 generates various control signals and controls the other parts of the processor. The AP register 2 receives an address pointer Pa and a latch signal Sp, and latches the former in synchronization with the latter. The value latched in the AP register 2 becomes the signal output from the AP register 2, and will be denoted Pb. The address pointer Pa may be furnished as part of the instruction executed just before the current instruction.

The adder 3 adds "1" to the value Pb of the address pointer held in the AP register 2, and outputs the result. The timing at which addition is performed is controlled by an addition timing signal Sa supplied from the controller 1. The selector 4 selects the output Pb of the AP register 2 or the output Pc of the adder 3 on the basis of an up/down selection signal Sud. When the up/down selection signal Sud has the value "0", the output Pb of the AP register 2 is selected; when the up/down selection signal Sud has the value "1", the output Pc of the adder 3 is selected. The output of the selector 4 is denoted Pd.

When the address counter 5 receives a count value setting signal Ss from the controller 1, the value (Pd) supplied from the selector 4 at that moment is set in the address counter 5 as an initial count value Pe. Thereafter, whenever a counting signal Sc is supplied from the controller 1, the count value Pe is incremented or decremented by one, as determined by the up/down selection signal Sud from the controller 1. When the up/down selection signal Sud indicates "1", the count value is incremented. When the up/down selection signal Sud indicates "0", the count value is decremented.

Figure 2:
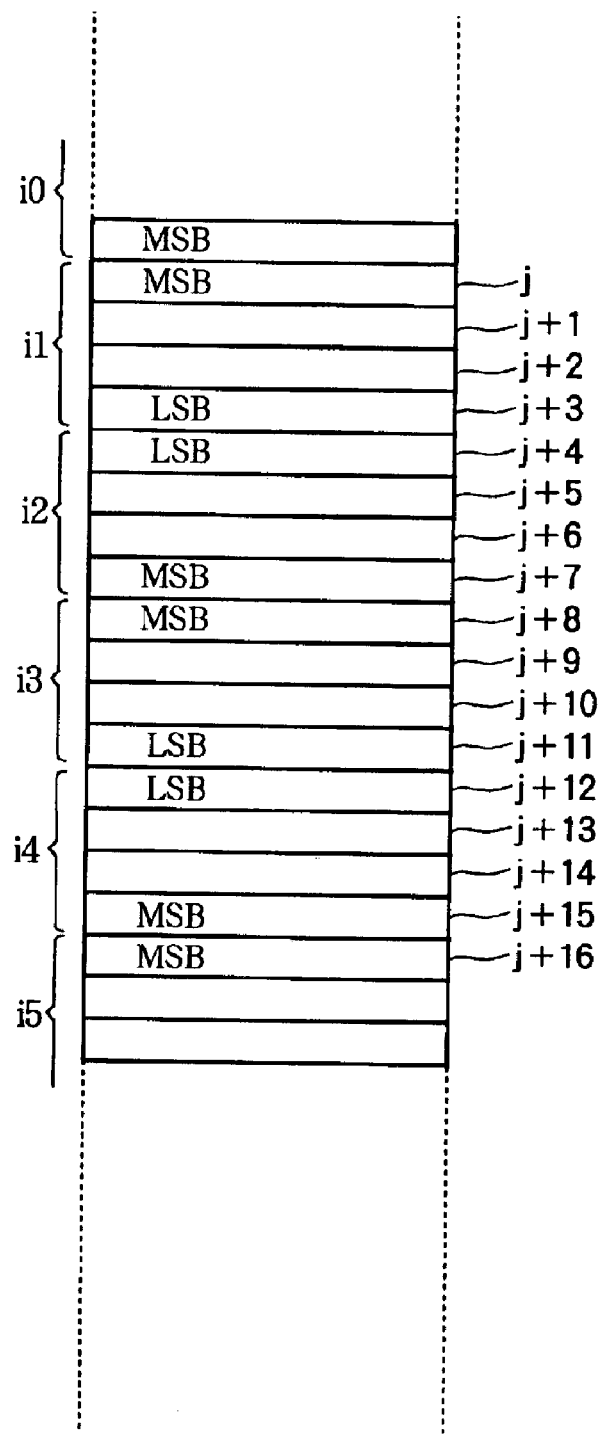
FIG. 2 is a diagram showing an arrangement of instructions and their constituent bytes in the memory unit in FIG. 1.

The memory unit 7 stores a plurality of instructions, as shown in FIG. 2. An instruction comprises, for example, four bytes, as illustrated; each of its constituent bytes is stored in a separate storage location or address. The bytes constituting each instruction are stored at contiguous addresses constituting an address group, in ascending or descending order of their address values. The bytes constituting an instruction will also be referred to as instruction bytes below.

To take an example, a first instruction i1 is stored at addresses j through j+3 in ascending order from its leading or most significant byte (MSB) to its last or least significant byte (LSB). The MSB of the first instruction i1 is stored at address j; the LSB of the first instruction i1 is stored at address J+3. A second instruction j2 is stored at addresses j+4 through j+7 in descending order from its leading byte to its last byte. The MSB of the second instruction i2 is stored at address j+7; the LSB of the second instruction i2 is stored at address j+4.

A third instruction i3 is stored at addresses j+8 through j+11 in ascending order from its leading byte to its last byte. The MSB of the third instruction i3 is stored at address j+8; the LSB of the third instruction i3 is stored at address j+11. A fourth instruction i4 is stored at addresses j+12 through j+15 in descending order from its leading byte to its last byte. The MSB of the fourth instruction i4 is stored at address j+15; the LSB of the fourth instruction i4 is stored at address j+12.

As described above, instructions with bytes stored in ascending order and instructions with bytes stored in descending order occur alternately. The leading instruction bytes (MSBs) or last instruction bytes (LSBs) of a pair of instructions stored in adjacent address groups are therefore disposed at adjacent addresses. For example, The MSBs of instructions i2 and i3 are mutually adjacent, the LSBs of instructions i1 and i2 are mutually adjacent, and the LSBs of instructions i3 and i4 are mutually adjacent.

The instruction register 8 has, for example, a capacity of four bytes, which are read from the memory unit 7, starting from the MSB of an instruction. Upon receiving a decoding timing signal Sd from the controller 1, the decoder 9 decodes the instruction currently stored in the instruction register 8. The instruction is thereby executed.

Figure 3:
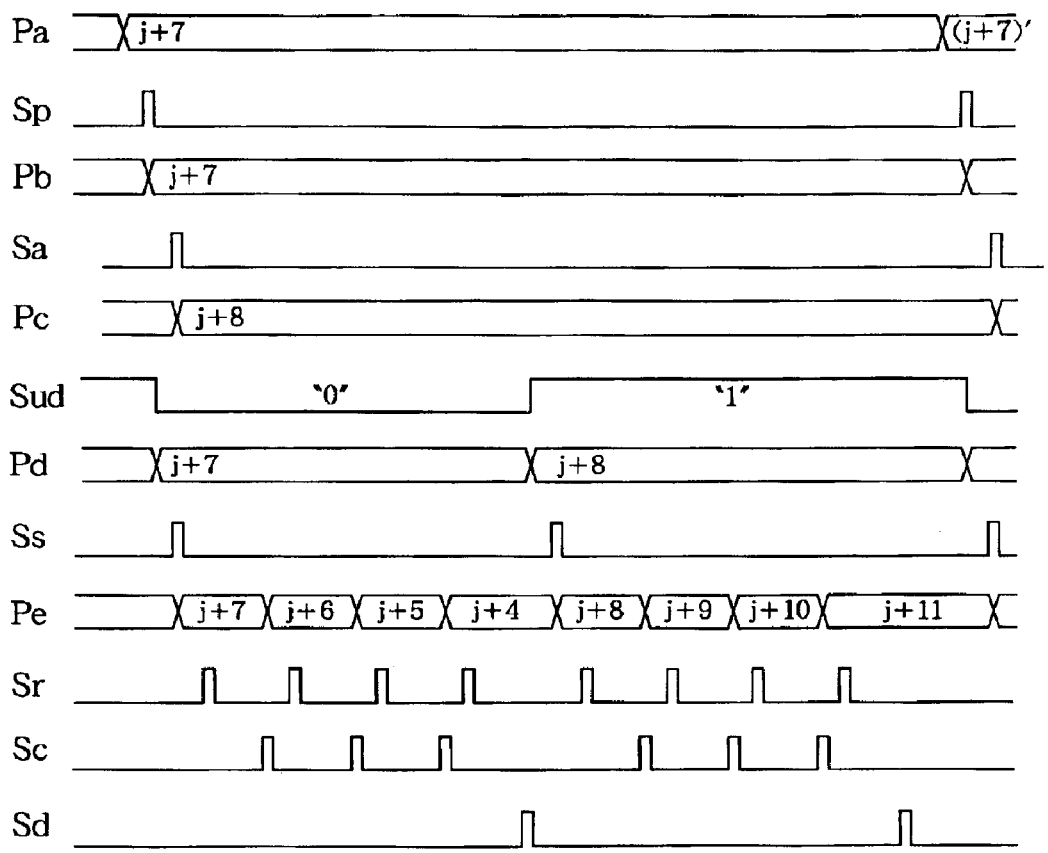
FIG. 3 is a timing diagram illustrating the operation of the first embodiment.

By way of an example, the execution of instructions i2 and i3 in the above series of instructions will be described below. FIG. 3 shows signals generated by respective parts of the processor when these operations are performed.

Suppose that address j+7 has been supplied as the address pointer Pa (possibly furnished as part of the instruction executed just before the current instruction, as mentioned above). The value (j+7) of the address pointer Pa is set in the AP register 2 by the latch signal Sp from the controller 1. Consequently, the value of the output Pb of the AP register 2 becomes j+7.

Suppose further that after execution of the instruction executed just before the current instruction, the up/down selection signal Sud was set to "0" by the controller 1. The selector 4 accordingly selects the output Pb of the AP register 2 for output to the address counter 5. The count value setting signal Ss is supplied from the controller 1 in this state. As a result, the output Pb (j+7) of the AP register 2 is set in the address counter 5 as the initial count value Pe. The output (count value) Pe of the address counter 5 thus becomes j+7. The output of the address counter 5 is supplied to the memory unit 7 as a readout address value.

When a readout timing signal Sr is generated after the address value j+7 has been set, the instruction byte stored at the address in the memory unit 7 specified by the count value Pe (j+7) of the address counter 5 is read out and stored in a first byte (MSB) storage location 8a of the instruction register 8. This completes the first read cycle, in which the first instruction byte of the instruction is read.

In the second readout cycle, the controller 1 generates the counting signal Sc. The count value Pe of the address counter 5 is decremented by one, becoming j+6. This count value Pe is supplied to the memory unit 7. When the readout timing signal Sr is supplied, the byte at address j+6 is read out and stored in a second storage location 8b of the instruction register 8.

In the third readout cycle, the controller 1 again generates the counting signal Sc, and the count value Pe of the address counter 5 is again decremented by one, becoming j+5. This count value Pe is supplied to the memory unit 7. When the readout timing signal Sr is supplied, the byte at address j+5 is read out and stored in a third byte storage location 8c of the instruction register 8.

In the fourth readout cycle, the controller 1 generates the counting signal Sc yet again and the count value Pe of the address counter 5 is decremented once more by one, becoming j+4. This count value is now supplied to the memory unit 7. When the readout timing signal Sr is supplied, the byte at address j+4 is read out and stored in a fourth byte storage location 8d of the instruction register 8.

The count value Pe of the address counter is thus decremented by one in each readout cycle. The instruction bytes of instruction i2 are read out sequentially from the MSB to the LSB, and stored in the instruction register 8.

When all the bytes constituting instruction i2 have been stored in the instruction register 8, the controller 1 outputs the decoding timing signal Sd. Instruction i2 is then decoded by the decoder 9 and executed.

During the execution of instruction i2, the controller 1 supplies the addition timing signal Sa to the adder 3. The adder 3 adds "1" to the value (j+7) stored in the AP register 2. Consequently, the output Pc of the adder 3 becomes j+8.

As a result of the execution of instruction i2, the controller 1 switches the up/down selection signal Sud to "1". The output Pc (j+8) of the adder 3 is now selected by the selector 4, so that when the count value setting signal Ss is driven to "1" again, the adder output is set in the address counter 5, becoming a new count value Pe. This count value Pe (j+8) is supplied from the address counter 5 to the memory unit 7.

The controller 1 now generates the readout timing signal Sr, causing the byte stored at the address (j+8) specified by the address counter 5 to be read out and stored in the first byte (MSB) storage location 8a of the instruction register 8.

When the controller 1 generates the counting signal Sc in the next readout cycle, since the up/down selection signal Sud is "1", the count value Pe of the address counter 5 is incremented by one, becoming j+9. This count value Pe is supplied to the memory unit 7. Then, when the readout timing signal Sr is generated, the byte at address j+9 is read out and stored in the second byte storage location 8b of the instruction register 8.

When the controller 1 generates the counting signal Sc in the next readout cycle, the count value Pe of the address counter 5 is again incremented by one, becoming j+10. This count value Pe is supplied to the memory unit 7. Then, when the readout timing signal Sr is supplied, the byte at address j+10 is read out and stored in the third byte storage location 8c of the instruction register 8.

When the controller 1 generates the counting signal Sc in the next readout cycle, the count value Pe of the address counter 5 is further incremented by one, becoming j+11. This count value Pe is supplied to the memory unit 7. Then, when the readout timing signal Sr is supplied, the byte at address j+11 is read out and stored in the fourth byte (LSB) storage location 8d of the instruction register 8.

The count value Pe of the address counter 5 is thus incremented by one at each readout cycle. The instruction bytes of instruction i3 are read out sequentially from the MSB to the LSB, and stored in the instruction register 8.

When all the bytes constituting instruction i3 at have been stored in the instruction register 8, the controller 1 outputs the decoding timing signal Sd. Instruction i3 is then decoded by the decoder 9 and executed.

In this manner, two instructions i2 and i3 are executed from a single address pointer value (j+7). Conventionally, two address pointer values were necessary for executing two instructions. Enabling two instructions to be executed by a single address pointer, as in this embodiment, enables the number of address pointers in a sequence of instructions or in a program to be reduced; that is, the necessary amount of address data can be reduced.

The foregoing description has covered the execution of instructions i2 and i3. Instruction i4 and the following instruction i5 are likewise stored with their MSBs mutually adjacent, and can be executed by use of a single address pointer value. Similarly, instruction i1 and the instruction i0 preceding instruction i1 can be executed by the use of a single address pointer.

In the embodiment described above, the address pointer set in the AP register 2 is supplied to the address counter 5 directly through the selector 4, and indirectly through the adder 3 and selector 4. The following scheme may also be employed: a subtracter for subtracting "1" is provided in place of the adder 3; the address pointer set in the AP register 2 is supplied to the address counter 5 directly through the selector 4 and indirectly through the subtracter and selector 4. In this case, as the single address pointer Pa pointing to two adjacently stored instructions such as instructions i2 and i3, the address of the MSB of the higher-address instruction (i.e. instruction i3) is supplied.

Second Embodiment

Figure 4:
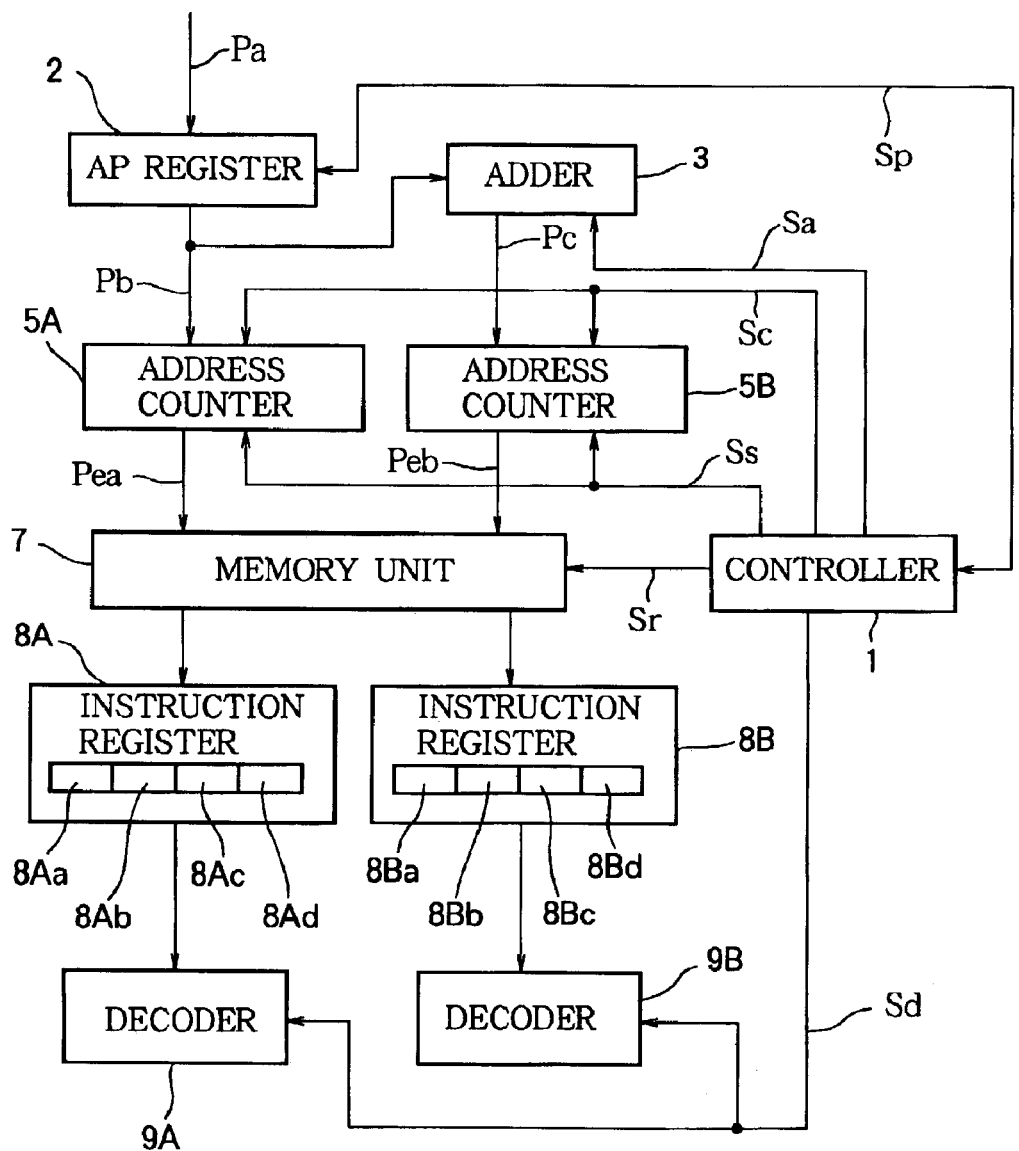
FIG. 4 is a block diagram showing a processor according to a second embodiment of the invention.

FIG. 4 is a block diagram showing the general configuration of a processor according to a second embodiment of the invention. This processor comprises a controller 1, an AP register 2, an adder 3, address counters 5A and 5B, a memory unit 7, instruction registers 8A and 8B, and decoders 9A and 9B. Elements that are the same as or correspond to elements in FIG. 1 are indicated by like reference characters.

When the address counters 5A and 5B receive the count value setting signal Ss from the controller 1, their inputs at that moment are set as count values Pea and Peb, respectively. In address counter 5A, count value Pea is decremented by one whenever the counting signal Sc is supplied. In address counter 5B, count value Pcb is incremented by one whenever the counting signal Sc is supplied. Address counter 5A thus operates as a down counter; address counter 5B operates as an up counter.

The memory unit 7 stores a plurality of instructions, as shown in FIG. 2 in the first embodiment. The memory unit 7 in the second embodiment permits two instruction bytes to be read from two addresses concurrently.

Each of the instruction registers 8A and 8B is identical to the instruction register 8 in the first embodiment, and sequentially stores a plurality of bytes read successively from the memory unit 7, starting from the MSB. Upon reception of respective decoding timing signals Sda and Sdb from the controller 1, the decoders 9A and 9B decode the instructions currently stored in instruction registers 8A and 8B, respectively. In other respects, detailed descriptions of which will be omitted, the processor in the second embodiment is the same as the processor in the first embodiment.

Figure 5:
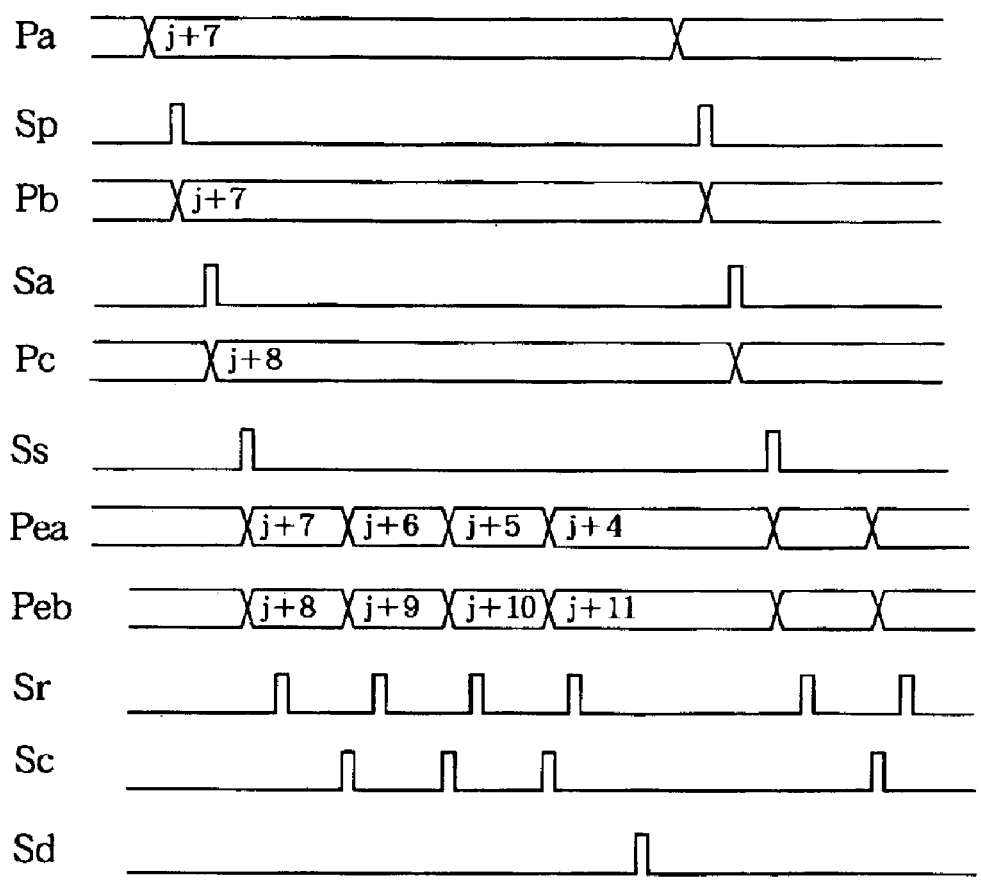
FIG. 5 is a timing diagram illustrating the operation of the second embodiment.

By way of an example, among the series of instructions in FIG. 2, the execution of instructions i2 and i3 will be described below, as in the first embodiment. FIG. 5 shows signals generated by respective parts of the processor when the operations described below are performed.

It will again be assumed that address j+7 has been supplied to the AP register 2 as the address pointer Pa (possibly furnished as part of the instruction executed just before the current instruction, as mentioned above). When the controller 1 outputs the latch signal Sp, the value of the address pointer Pa is set in the AP register 2. Consequently, the value of the output Pb of the AP register 2 becomes j+7. This output value Pb is supplied to the adder 3. When the addition timing signal Sa is generated by the controller 1, the adder 3 adds one to the Pb value, the output Pc of the adder 3 becomes j+8, and this value is supplied to address counter 5B.

Then, when the count value setting signal Ss is supplied from the controller 1, the output Pb (j+7) of the AP register 2 and the output Pc (j+8) of the adder 3 are set in the address counters 5A and 5B as initial count values Pea and Peb, respectively. These count values are supplied to the memory unit 7 as address values.

When the readout timing signal Sr is generated by the controller 1 in this state, the instruction byte stored at the address (j+7) specified by the count value of address counter 5A is read out and stored in the first byte (MSB) storage location 8Aa of instruction register 8A. Concurrently therewith (in the same readout cycle), the instruction byte stored at the address (j+8) specified by the count value of address counter 5B is read out and stored in the MSB storage location 8Ba of instruction register 8B.

In the next readout cycle, when the counting signal Sc is generated by the controller 1, the count value Pea of address counter 5A is decremented by one, becoming j+6, and is supplied to the memory unit 7. Concurrently therewith, the count value Peb of address counter 5B is incremented by one, becoming j+9, and is also supplied to the memory unit 7. When the readout timing signal Sr is generated by the controller 1 in this state, the byte at address j+6 of the memory unit 7 is read out and stored in the second byte storage location 8Ab of instruction register 8A. At the same time, the byte at address j+9 is read out and stored in the second byte storage location 8Bb of instruction register 8B.

In the next readout cycle, when the counting signal Sc is generated by the controller 1, the count value Pea of address counter 5A is again decremented by one, becoming j+5, and is supplied to the memory unit 7. Concurrently therewith, the count value Peb of address counter 5B is incremented by one, becoming j+10, and is supplied to the memory unit 7. When the readout timing signal Sr is generated by the controller 1 in this state, the byte at address j+5 of the memory unit 7 is read out and stored in the third byte storage location 8Ac of instruction register 8A. At the same time, the byte at address j+10 is read out and stored in the third byte storage location 8Bc of instruction register 8B.

In the next readout cycle, when the counting signal Sc is generated by the controller 1, the count value Pea of address counter 5A is once again decremented by one, becoming j+4, and this count value is supplied to the memory unit 7. Concurrently therewith, the count value Peb of address counter 5B is incremented by one, becoming j+11, and this count value Peb is supplied to the memory unit 7. When the readout timing signal Sr is generated by the controller 1 in this state, the byte at address j+4 of the memory unit 7 is read out and stored in the fourth byte (LSB) storage location 8Ad of instruction register 8A. At the same time, the byte at address j+11 is read out and stored in the fourth byte storage location 8Bd of instruction register 8B.

In this manner, the count value of address counter 5A is decremented by one at each readout cycle. The four bytes of instruction i2, stored at addresses j+7 through j+4, are read out sequentially from the MSB to the LSB and stored in instruction register 8A. Concurrently therewith, the count value of address counter 5B is incremented by one at each readout cycle. The four bytes of instruction i3, stored at addresses j+8 through j+11, are sequentially read out from the MSB to the LSB and stored in instruction register 8B. After all the bytes of these instructions i2 and i3 have been stored in the instruction registers 8A and 8B, the controller 1 outputs the decoding timing signal Sd. In response to this signal, the instructions stored in the instruction registers 8A and 8B are decoded by the decoders 9A and 9B, respectively, and executed.

In this manner, two instructions are executed concurrently, using a single address pointer value. Conventionally, two address pointer values were necessary for executing two instructions. Enabling two instructions to be executed by a single address pointer, as in this embodiment, enables the number of address pointers in a sequence of instructions to be reduced; that is, the necessary amount of address data can be reduced.

As in the first embodiment, instruction i4 and the following instruction i5, which are likewise stored with their MSBs mutually adjacent, can be executed concurrently by use of a single address pointer value. Similarly, instruction i1 and the preceding instruction i0 can be executed concurrently by use of a single address pointer value.

Third Embodiment

It was assumed in the second embodiment that the two instructions stored at mutually adjacent addresses and read by the common address pointer Pa could be processed concurrently: that is, that the two instructions were not mutually dependent. In the third embodiment, a pair of instructions that are not concurrently processable may also be stored at mutually adjacent addresses and read by a common address pointer. Information indicating whether the instructions are concurrently processable, and if concurrent processing is not possible, information indicating which instruction needs to be executed first, can be included in predetermined bits of one or both of the instructions. After the instructions have been read into the instruction registers 8A and 8B, the information indicating whether concurrent processing is possible is read. If concurrent processing is not possible, the instruction that needs to be executed first is executed; then, the other instruction is executed.

Figure 6:
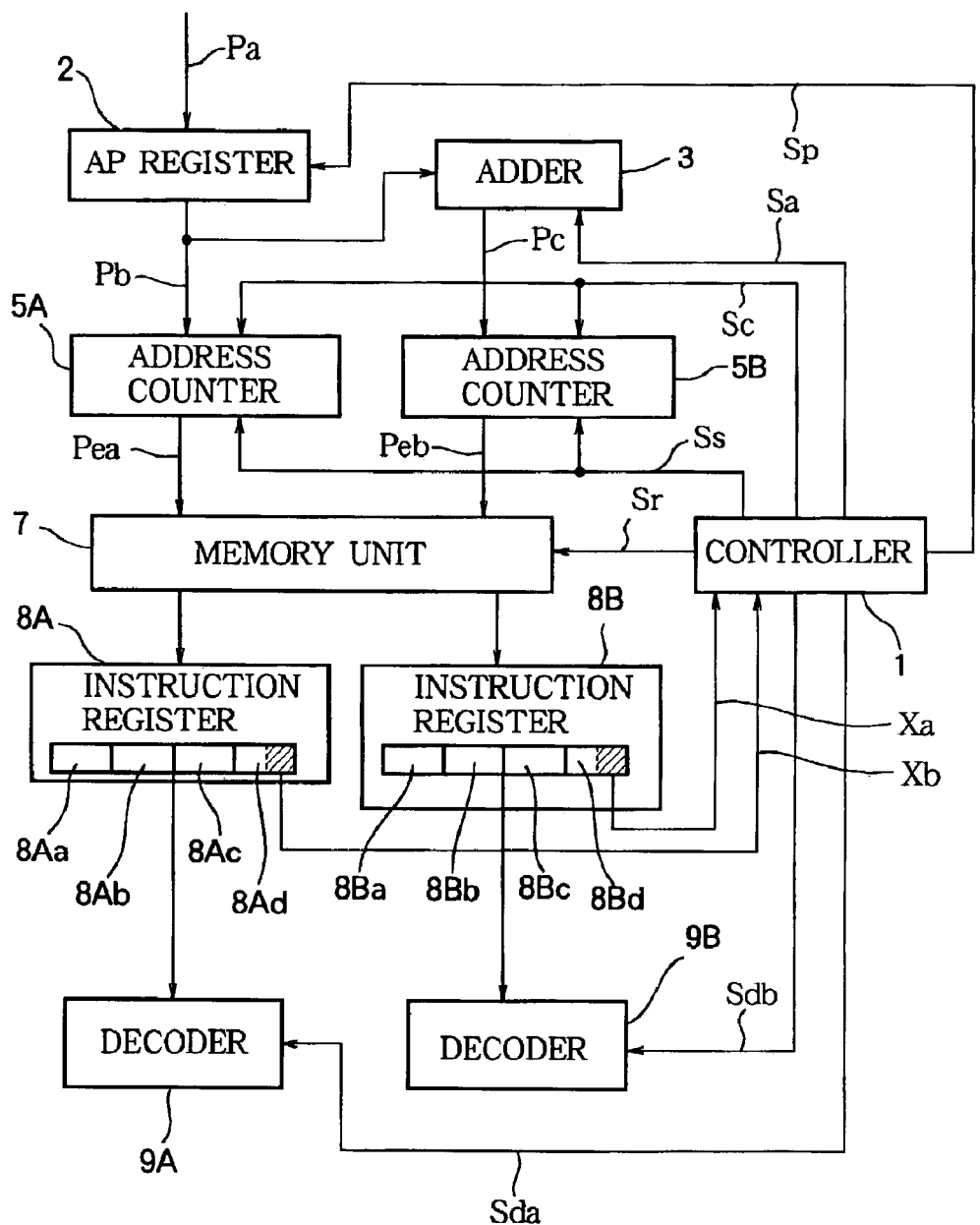
FIG. 6 is a block diagram showing a processor according to a third embodiment of the invention.

FIG. 6 shows a configuration that enables the processing described above. The processor in FIG. 6 has the same structure as the processor illustrated in FIG. 4, but includes signal lines Xa and Xb coupled to predetermined bits of the instruction registers, for transmitting the values of these bits to the controller 1. The other bits of the instruction registers 8A and 8B are transmitted to the decoders 9A and 9B. In addition, the controller 1 supplies two decoding timing signals Sda and Sdb: decoding timing signal Sda is supplied to decoder 9A; decoding timing signal Sdb is supplied to decoder 9B.

The general operation of this embodiment is the same as in the second embodiment, but differs in the following respects. Based on information transmitted through signal lines Xa and Xb, the controller 1 determines whether the two instructions simultaneously read from the memory unit 7 into the instruction registers 8A and 8B can be processed concurrently. If they can be processed concurrently, the controller 1 outputs the decoding timing signals Sda and Sdb simultaneously. If they cannot be processed concurrently, the controller 1 determines which instruction is to be executed first, then supplies decoding timing signal Sda or Sdb to the decoder 9A or 9B coupled to the instruction register 8A or 8B that stores the instruction to be executed first. After decoder 9A or 9B has finished executing this instruction, the controller 1 supplies decoding timing signal Sdb or Sda to the other decoder 9B or 9A, thereby causing this decoder 9B or 9A to decode the instruction to be executed next. With this arrangement, instruction execution can be serialized as necessary.

Fourth Embodiment

Figure 7:
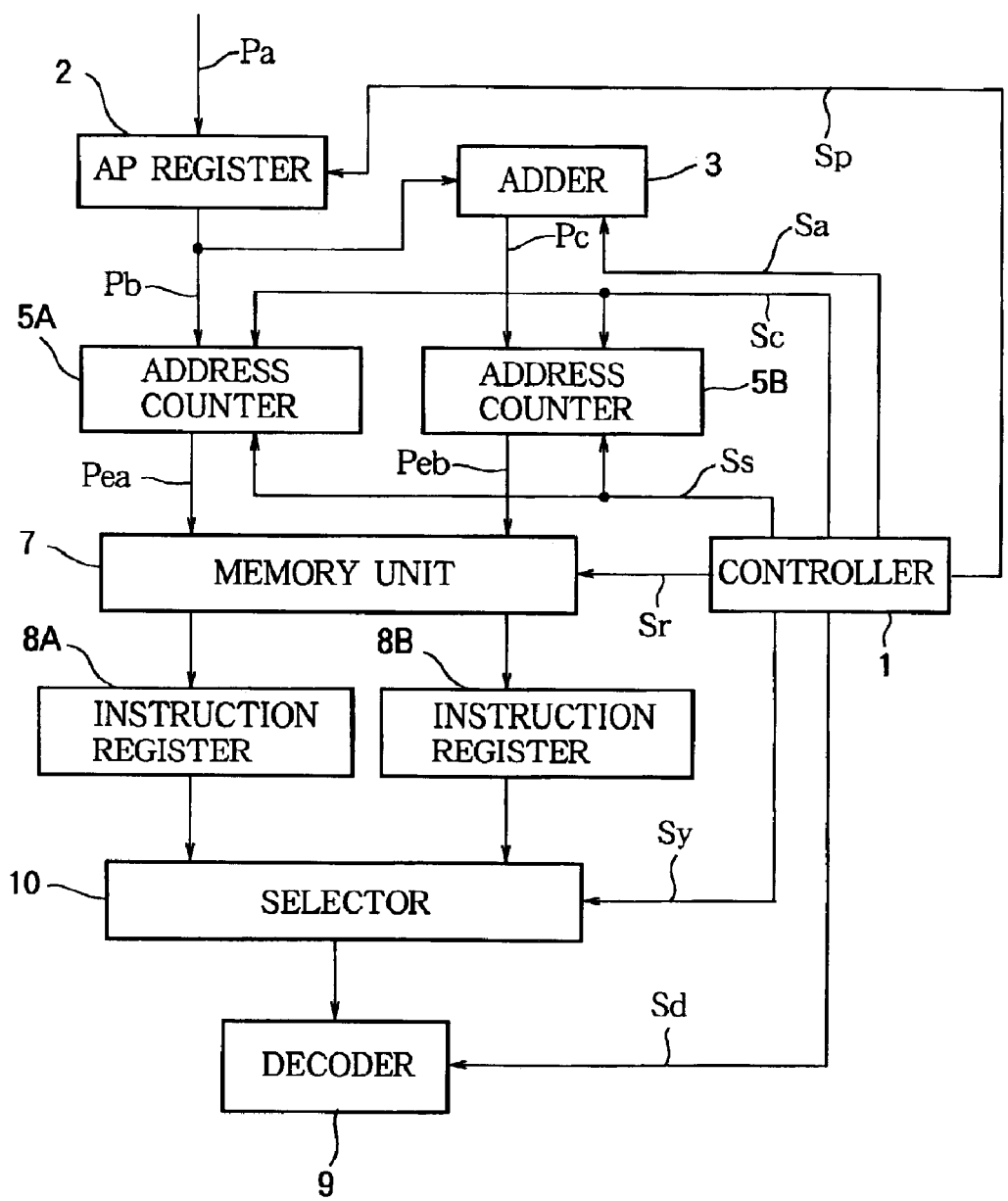
FIG. 7 is a block diagram showing a processor according to a fourth embodiment of the invention.

FIG. 7 shows a processor according to a fourth embodiment of the present invention. Though the processor in this embodiment is similar to the processor in the second embodiment, it differs in the following respects: a single decoder 9 is provided in place of the two decoders 9A and 9B; decoder 9 receives the output of a selector 10 that selects the output of instruction register 8A or 8B.

The selector 10 is controlled by an instruction selection signal Sy from the controller 1. If the instruction selection signal Sy from the controller 1 indicates "0", the selector 10 selects the output of instruction register 8A. If the instruction selection signal Sy from the controller 1 indicates "1", the selector 10 selects the output of instruction register 8B. Upon receiving the decoding timing signal Sd from the controller 1, the decoder 9 decodes the instruction currently supplied from the selector 10.

The operations in the fourth embodiment through the storage of instructions in the instruction registers 8A and 8B are the same as in the second embodiment.

When instructions have been stored in the instruction registers 8A and 8B, the controller 1 sets the instruction selection signal Sy to "0" or "1" to command the selector 10 to select the output of one of the instruction registers 8A and 8B, then supplies the decoding timing signal Sd to the decoder 9. If the value of the instruction selection signal Sy is "0", for example, indicating instruction register 8A, then the output of instruction register 8A is selected and supplied to the decoder 9. When the decoding timing signal Sd is output in this state, the output of the selector 10, which is the output of instruction register 8A at that moment, is decoded by the decoder 9, and the instruction stored in instruction register 8A is executed.

After execution of this instruction, the controller 1 switches the instruction selection signal Sy to the other value, to "1" in this example. The output of instruction register 8B is now selected by the selector 10 and supplied to the decoder 9. When the decoding timing signal Sd is output in this state, the output of the selector 10, which is the output of instruction register 8B at that moment, is decoded by the decoder 9, and the instruction stored in instruction register 8B is executed.

In the fourth embodiment, as in the third embodiment, a bit of information indicating the desired execution order of the two instructions read using the same address pointer value can be included in one or both of the two instructions. The controller 1 can determine the value of the instruction selection signal Sy in each instruction execution cycle from this bit of information, thus using the bit of information to control the selector 10 and control the order of execution of the instructions.

Fifth Embodiment

In the above embodiments, a pair of instructions such as instructions i2 and i3 were read out and executed by use of the same address pointer. The fifth embodiment relates to the execution of branch instructions when the memory unit 7 stores a plurality of instructions in the manner illustrated in FIG. 2.

In conventional branch instructions, when a certain condition is satisfied, a jump is made to an address given in the branch instruction. If the condition is not satisfied, execution proceeds to the address of the instruction following the branch instruction. Alternatively, a jump may be made to one of two addresses given in the branch instruction, according to whether a condition is satisfied or not.

A branch instruction in the fifth embodiment includes a single jump destination address, and direction information indicating whether to read instruction bytes from the jump destination address in ascending or descending order, depending on whether a predetermined condition is satisfied or not. The jump destination address is used as an address pointer value. A single bit suffices for the direction information.

The operation when this type of branch instruction is executed will be described below. The processor will be assumed to have the configuration illustrated in FIG. 1. In the instruction execution cycle in which the branch instruction is executed, the controller 1 reads the address pointer value given in the branch instruction, sets this value in the AP register 2, extracts the information indicating the ascending or descending address reading direction, and sets the up/down selection signal Sud according to the direction information. If the direction information indicates the ascending address order, the controller 1 sets Sud to "1". If the direction information indicates the descending address order, the controller 1 sets Sud to "0".

In the first embodiment, two mutually adjacent instructions are sequentially read and executed by use of the same address pointer. In the fifth embodiment, following a branch instruction, only one of the two mutually adjacent instructions may be read and executed; the other instruction is not always executed. Even so, the amount of address information needed to execute a program is reduced, because the amount of address data included in branch instructions is reduced.

Sixth Embodiment

Figure 8:
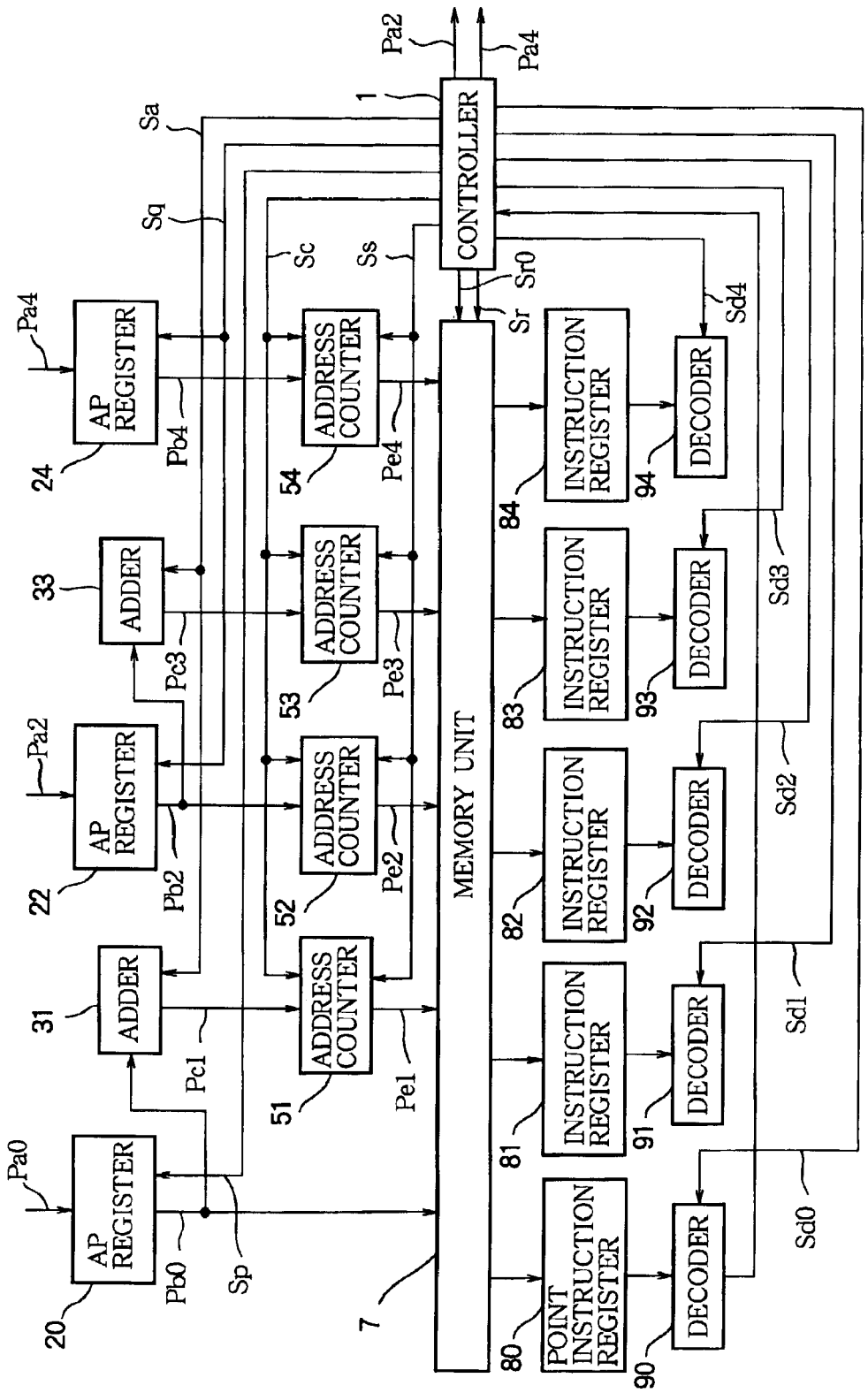
FIG. 8 is a block diagram showing a processor according to a sixth embodiment of the invention.

FIG. 8 shows a processor according to a sixth embodiment of the present invention. This processor, which can perform concurrent processing of four instructions, includes a controller 1, three AP registers 20, 22, 24, two adders 31, 33, four address counters 51, 52, 53, 54, a memory unit 7, a point instruction register 80, four instruction registers 81, 82, 83, 84, a point instruction decoder 90, and four further decoders 91, 92, 93, 94.

Each of the AP registers 20, 22, 24 is identical to the AP register 2 in the above embodiments. However, the respective AP registers 20, 22, 24 receive different address pointers: AP register 20 receives an address pointer Pa0, AP register 22 receives an address pointer Pa2, and AP register 24 receives an address pointer Pa4. Address pointers Pa2 and Pa4 are generated when the instruction pointed to by address pointer Pa0 is executed. This instruction may include address pointers Pa2 and Pa4, for example. Address pointers Pa2 and Pa4 will also be referred to as "internal address pointers" to distinguish them from the main address pointer Pa0. The instruction pointed to by the main address pointer Pa0 will be referred to as a point instruction.

Each of the adders 31 and 33 is identical to the adder 3 in the embodiments above. Similarly, each of the address counters 51, 52, 53, 54 is identical to one of the address counters 5, 5A, 5B, each of the instruction registers 81, 82, 83, 84 is identical to one of the instruction registers 8, 8A, 8B, and each of the decoders 91, 92, 93, 94 is identical to one of the decoders 9, 9A, 9B in the embodiments above.

The point instruction register 80 holds a one-byte instruction (a point instruction) read from the memory unit 7. The point instruction decoder 90 decodes the point instruction held in the point instruction register 80. The point instruction is thereby executed, generating the internal address pointers supplied to AP registers 22 and 24.

Upon reception of a first readout timing signal Sr0, the memory unit 7 reads out the instruction at the address specified by the output of AP register 20. Upon reception of a second readout timing signal Sr, the memory unit 7 simultaneously reads out instruction bytes at four addresses specified by the address counters 51 through 54.

Figure 9:
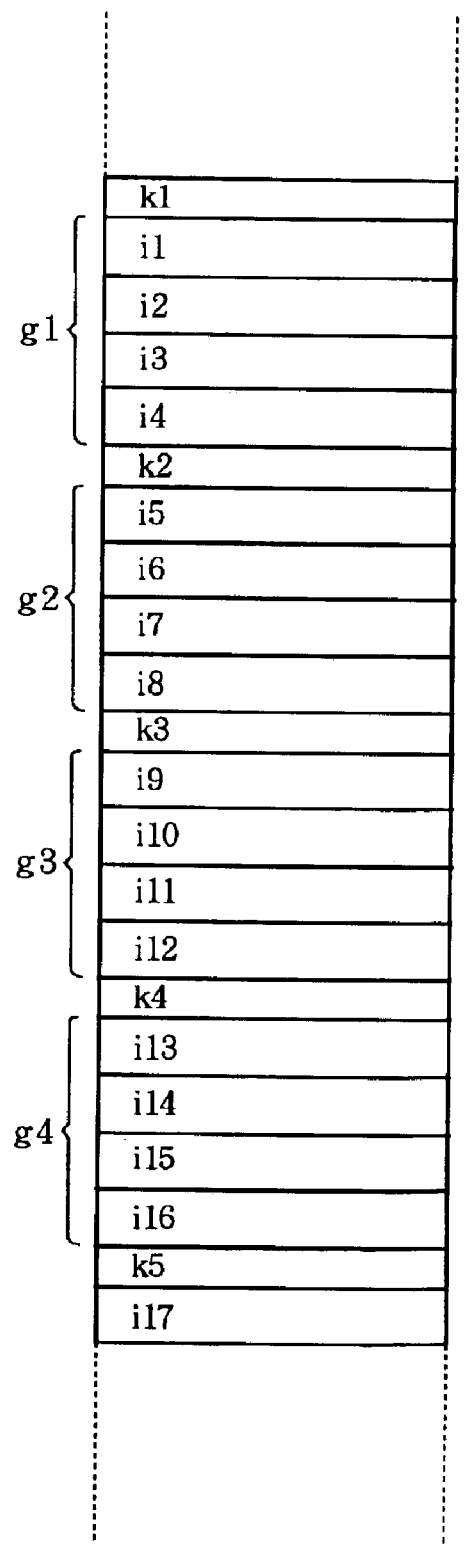
FIG. 9 is a diagram showing an arrangement of instructions in the memory unit in FIG. 8.
Figure 10:
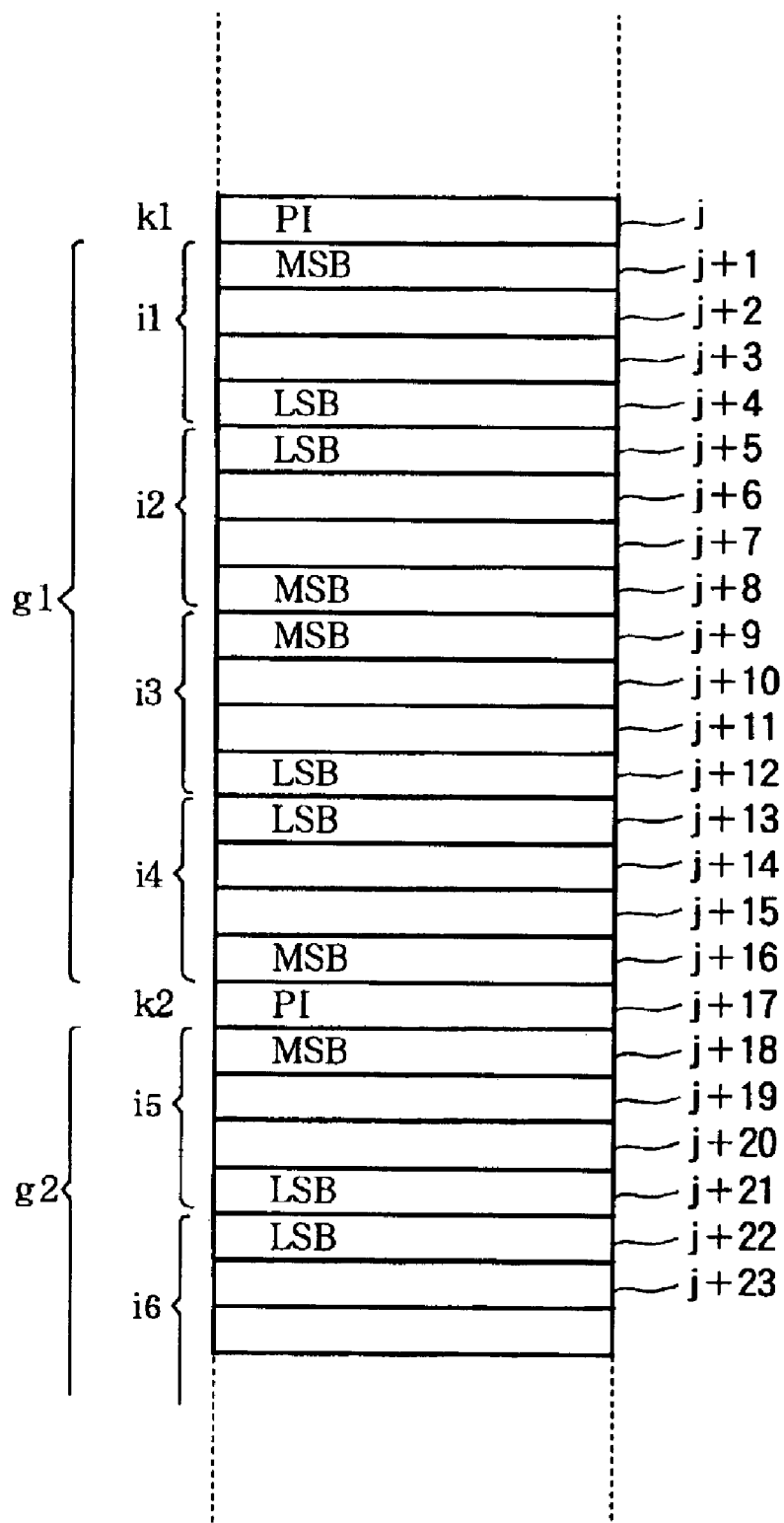
FIG. 10 is a diagram showing an arrangement of constituent bytes in the memory unit in FIG. 8.

The memory unit 7 stores a plurality of instructions as illustrated in FIGS. 9 and 10. FIG. 9 shows an overview of the instruction arrangement, while FIG. 10 shows part of FIG. 9 in more detail. The instruction arrangement illustrated in FIGS. 9 and 10 is generally similar to the arrangement in FIG. 2, but the instructions are grouped into groups of four instructions, and a point instruction is positioned at an address immediately preceding the storage location or address of each instruction group. For example, instructions i1, i2, i3, and i4 constitute an instruction group g1, instructions i5, i6, i7, and i8 constitute an instruction group g2, instructions i9, i10, i11, and i12 constitute an instruction group g3, and instructions i13, i14, i15, and i16 constitute an instruction group g4. Point instructions k1, k2, k3, and k4 are positioned at addresses immediately preceding the addresses of these instruction groups.

FIG. 10 illustrates instruction group g1 and the point instruction k1 immediately preceding it, together with part of the next instruction group g2 and the point instruction k2 immediately preceding instruction group g2.

As shown in FIG. 10, an instruction such as instruction i1 or i2 includes four bytes, as was the case of FIG. 2, while a point instruction such as instruction k1 or k2 includes only one byte. The four bytes constituting a four-byte instruction are stored sequentially at consecutive addresses.

Instruction i1, for example, is stored at addresses j+1 through j+4 in ascending order from the leading byte (MSB) to the last byte (LSB) the MSB of instruction i1 is stored at address j+1: the LSB of instruction i1 is stored at address j+4. The next instruction i2 is stored at addresses j+5 through j+8 in descending order from the MSB to the LSB: the MSB of instruction i2 is stored at address j+8; the LSB of instruction i2 is stored at address j+5. The third instruction i3 is stored at addresses j+9 through j+12 in ascending order from the MSB to the LSB: the MSB of instruction i3 is stored at address j+9; the LSB of instruction i3 is stored at address j+12. The fourth instruction i4 is stored at addresses j+13 through j+16 in descending order from the MSB to the LSB: the MSB of instruction i4 is stored at address j+16; the LSB of instruction i4 is stored at address j+13.

As in the preceding embodiments, instructions with their instruction bytes stored in ascending order and instructions with their instruction bytes stored in descending order occur alternately.

Figure 11:
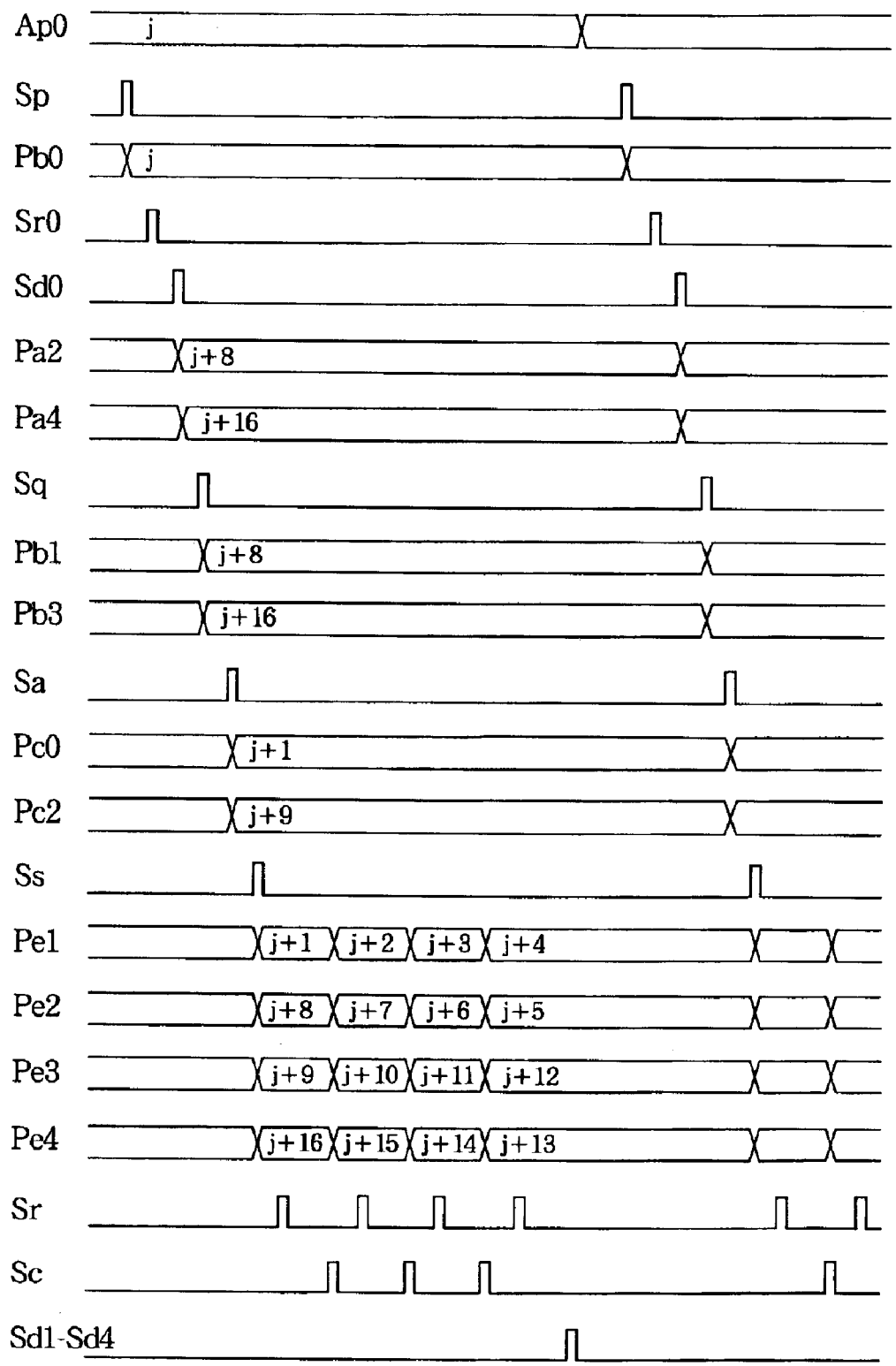
FIG. 11 is a timing diagram showing illustrating the operation of the sixth embodiment.

By way of an example, the execution of instructions i1 through i4 in instruction group g1 will be described below. FIG. 11 shows signals generated by respective parts of the processor when these operations are performed.

In order to execute these instructions, address j is first supplied to AP register 20 as the main address pointer Pa0 (possibly furnished as part of the instruction executed just before) and is set in AP register 20 in response to a latch signal Sp from the controller 1.

When readout timing signal Sr0 is supplied to the memory unit 7 from the controller 1 in this state, the one-byte point instruction at address j is read out and placed in the point instruction register 80. Next, a decoding timing signal Sd0 is supplied to the point instruction decoder 90 from the controller 1. The point instruction is then executed, generating internal address pointers Pa2 and Pa4 indicating addresses j+8 and j+16, which are supplied to AP registers 22 and 24.

The controller 1 now generates an address pointer latch signal Sq, causing AP registers 22 and 24 to latch the values (j+8 and j+16) of the internal address pointers Pa2 and Pa4. The outputs of the AP registers 22 and 24 are denoted Pb2 and Pb4, respectively.

Next, when an addition timing signal Sa is supplied from the controller 1, the adders 31 and 33 add "1" to the address values held in AP registers 20 and 22. As a result, the output values Pc1 and Pc3 of the adders 31 and 33 become j+1 and j+9.

Next, when a count setting signal Ss is generated, the output Pc1 of adder 31, the output Pb2 of AP register 22, the output Pc3 of adder 33, and the output Pb4 of AP register 24 are set in the address counters 51, 52, 53, and 54 as initial count values. As a result, the count values Pe1, Pe2, Pe3, and Pe4 of the address counters 51, 52, 53, and 54 become j+1, j+8, j+9, and j+16, respectively.

When readout timing signal Sr is generated in this state, the instruction bytes stored at addresses j+1, j+8, j+9, and j+16 are read out and placed in the MSB storage locations of instruction registers 81, 82, 83, and 84, respectively.

Next, a counting signal Sc is generated, incrementing the count values of address counters 51 and 53 by one, and decrementing the count values of address counters 52 and 54 by one. As a result, the count values of then address counters 51, 52, 53, and 54 become j+2, j+7, j+10, and j+15, respectively. When readout timing signal Sr is generated in this state, the instruction bytes stored at the addresses j+2, j+7, j+10, and j+15 specified by the count values of the address counters 51, 52, 53, and 54 are read out and placed in the second byte storage locations of the instruction registers 81, 82, 83, and 84, respectively.

Next, the counting signal Sc is generated again. As before, the count values of address counters 51 and 53 are incremented by one, and the count values of address counters 52 and 54 are decremented by one. As a result, the count values of the address counters 51, 52, 53, and 54 become j+3, j+6, j+11, and j+14. When readout timing signal Sr is generated in this state, the instruction bytes stored at addresses j+3, j+6, j+11, and j+14 are read out and placed in the third byte storage locations of the instruction registers 81, 82, 83, and 84, respectively.

Next, the counting signal Sc is generated yet again, incrementing the count values of address counters 51 and 53 and decrementing the count values of address counters 52 and 54 once more. As a result, the count values of the address counters 51, 52, 53, and 54 become j+4, j+5, j+12, and j+13, respectively. When readout timing signal Sr is generated in this state, the instruction bytes stored at addresses j+4, j+5, j+12, and j+13 are read out and placed in the LSB storage locations of the instruction registers 81, 82, 83, and 84, respectively.

Each of the instruction registers 81, 82, 83, 84 now holds the four bytes of a complete instruction. Next, decoding timing signals Sd1, Sd2, Sd3, Sd4 are generated and the decoders 91, 92, 93, 94 decode the instructions stored in the respective instruction registers 81, 82, 83, 84. The instructions are thereby executed.

The four instructions described above are executed concurrently. Upon execution of these instructions, an address pointer pointing to the next point instruction is generated, and operations similar to the above are repeated.

In FIG. 11, the decoding timing signals Sd1, Sd2, Sd3, Sd4 are shown as being generated simultaneously. If concurrent processing cannot be executed, however, the decoding signals may be generated at different timings, as described in the preceding embodiments. As explained in reference to FIG. 6, information indicating whether the four instructions can be processed concurrently may also be included in the point instruction. The operations in this case differ from the operations described above in the following respects: if information indicating that the four instructions cannot be processed concurrently is included in the point instruction, then when the point instruction is decoded, the controller 1 recognizes that concurrent processing is impossible and generates the decoding timing signals Sd1 through Sd4 in a predetermined order. Information indicating the necessary decoding order may be included in one or all of the four instructions. In this case, the decoding timing signals Sd1 through Sd4 are generated according to the included information.

As another alternative, the point instruction at the address specified by address pointer Pa0 and one byte of another instruction, its LSB, for example, may be read concurrently.

Seventh Embodiment

In the sixth embodiment described above, four instructions (such as instructions i1, i2, i3, and i4) that can be read out using the address (j+1) following the point instruction and two addresses (j+8 and j+16) specified in the point instruction are all read and executed. The seventh embodiment relates to the execution of a branch instruction when the memory unit 7 stores a plurality of instructions in the arrangement shown in FIG. 10.

A branch instruction in this embodiment includes a single address pointer giving an address at which a point instruction is stored. As a result of execution of the branch instruction, two types of information are generated: one is information indicating a distance from the address of the point instruction to the address of a jump destination instruction in an instruction group comprising a plurality of instructions (e.g., four instructions). The other is direction information indicating whether to read the instruction bytes in ascending or descending order from the jump destination address. A single bit suffices for the direction information. The number of instructions to be processed concurrently differs depending on the jump destination address and the address reading direction. In the example shown in FIGS. 9 and 10, for example, if the distance from the jump destination address is "1" and the reading direction is "forward", four instructions (i1, i2, i3, and i4) are processed concurrently. If the distance from the jump destination address is "8" and the reading direction is "backward", three instructions (i2, i3, and i4) are processed concurrently. If the distance from the jump destination address is "8" and the reading direction is "forward", two instructions (i3 and i4) are processed concurrently. If the distance from the jump destination address is "16" and the reading direction is "backward", only one instruction (i4) is processed.

Figure 12:
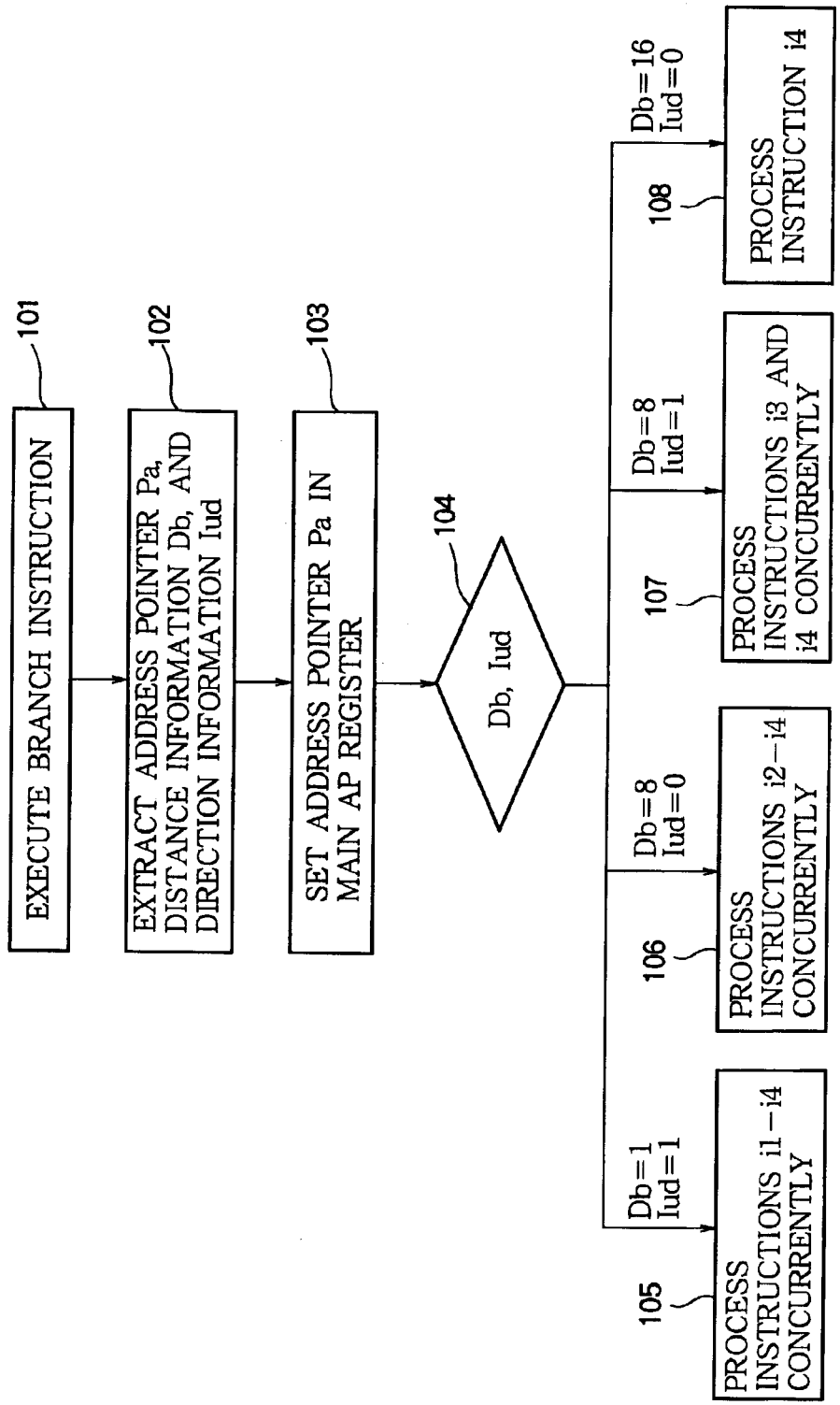
FIG. 12 is a flowchart illustrating the operation of a seventh embodiment.
Figure 13:
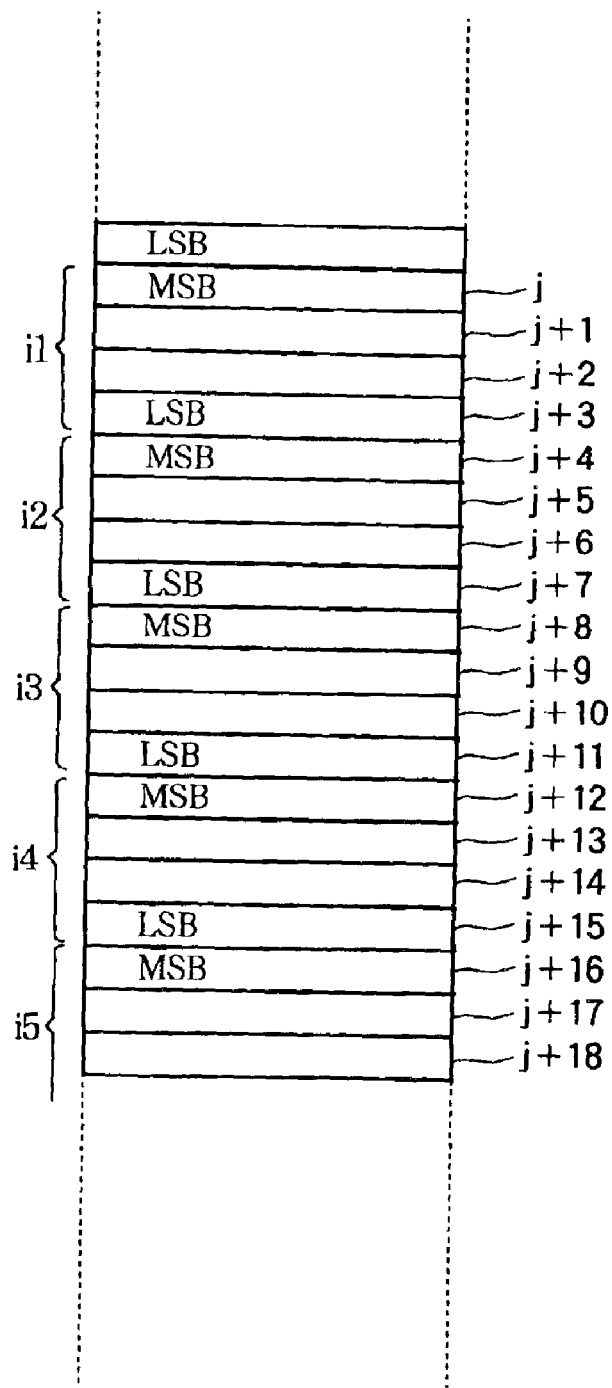
FIG. 13 is a diagram showing an arrangement of instructions and constituent bytes in the memory unit of a conventional processor.

The operation when a branch instruction is executed under these conditions will be described with reference to FIG. 12. The processor will be assumed to have the structure illustrated in FIG. 8.

First, in step 101, the branch instruction is executed in an arbitrary instruction execution cycle. In step 102, the controller 1 extracts the address pointer Pa given in the branch instruction, and also extracts information indicating a distance Db from the point instruction address represented by the address pointer Pa to a jump destination address in the following instruction group. The distance Db may be, for example, "1", "8", or "16". The controller 1 further extracts one-bit information Iud indicating whether to read instruction bytes in ascending order or descending order from the jump destination address.

In step 103, the address pointer Pa is supplied to and set in the main AP register 20. Next, different operations are performed according to the distance Db and the reading direction Iud extracted by the controller 1, as indicated in step 104.

If Db=1 and Iud=1, instructions i1, i2, i3, and i4 are processed concurrently in step 105. This is the same as the operation described in the sixth embodiment.

If Db=8 and Iud=0, instructions i2, i3, and i4 are processed concurrently in step 106. This processing is performed by operating the AP registers 20, 22, and 24, adder 33, address counters 52, 53, and 54, instruction registers 82, 83, and 84, and decoders 92, 93, and 94 in the same manner as in the sixth embodiment, without operating adder 31, address counter 51, instruction register 81, and decoder 91. In practice, adder 31, address counter 51, and instruction register 81 may operate; the same effect is still obtained if decoder 91 is kept from operating.

If Db=8 and Iud=1, instructions i3 and i4 are processed concurrently in step 107. This processing is performed by operating the AP registers 20, 22, and 24, adder 33, address counters 53 and 54, instruction registers 83 and 84, and decoders 93 and 94 in the same manner as in the sixth embodiment, without operating adder 31, address counters 51 and 52, instruction registers 81 and 82, and decoders 91 and 92. In practice, adder 31, address counters 51 and 52, and instruction registers 81 and 82 may operate; the same effect is still obtained if decoders 91 and 92 are kept from operating.

If Db=16, and Iud=0, instruction i4 alone is processed in step 105. This processing is performed by operating AP registers 20 and 24, address counter 54, instruction register 84, and decoder 94 in the same manner as in the sixth embodiment without operating AP register 22, adders 31 and 33, address counters 51, 52, and 53, instruction registers 81, 82, and 83, and decoders 91, 92, and 93. In practice, AP register 22, adders 31 and 33, address counters 51, 52, and 53, and instruction registers 81, 82, and 83 may operate; the same effect is still obtained if decoders 91, 92, and 93 are kept from operating.

If one of the executed instructions is a branch instruction, the operation returns to step 101 and the same process is repeated.

The present invention enables the number of address pointers in a sequence of instructions to be reduced, so that the amount of address information needed to execute a program can be reduced. Further, when a plurality of instructions are processed concurrently, regardless of the number of instructions, only one address pointer is needed, so the amount of information needed to execute the program can again be reduced. Still further, when the processor of the present invention is employed for execution of a branch instruction, the instruction to be executed after branching can be specified by information indicating a jump destination (an address pointer), and information indicating a reading direction, instead of information indicating two or more different jump destinations, so the necessary amount of information can be reduced yet again.

The invention is not limited to the embodiments described above; those skilled in the art will recognize that various modification are possible. The scope of the invention should accordingly be determined from the appended claims.

What is claimed is:

1. A processor comprising:

an address counter for counting up and down;

a memory unit storing a plurality of instructions, each instruction having a plurality of constituent bytes; and a controller controlling the address counter and the memory unit;

wherein each of said constituent bytes is stored at a separate address in the memory unit;

the constituent bytes constituting said each instruction are stored in ascending or descending address order in an address group consisting of consecutive addresses;

a leading constituent byte of a first instruction and a leading constituent byte of a second instruction are stored at mutually adjacent addresses;

the constituent bytes of the first instruction are stored in descending address order, the constituent bytes of the second instruction being stored in ascending address order;

an address pointer indicating the address of the leading constituent byte of the first or second instruction is provided;

an initial count value is set in the address counter according to the address pointer, the constituent bytes of the first instruction are read in sequential order while the address counter counts down, and the first instruction is executed; and another initial count value is set in the address counter according to the address pointer, the constituent bytes of the second instruction are read in sequential order while the address counter counts up, and the second instruction is executed.

2. A processor comprising:

a first address counter for counting down;

a second address counter for counting up;

a memory unit storing a plurality of instructions, each instruction having a plurality of constituent bytes; and a controller controlling the first and second address counters and the memory unit;

wherein each of said constituent bytes is stored at a separate address in the memory unit;

the constituent bytes constituting said each instruction are stored in ascending or descending address order in an address group consisting of consecutive addresses;

a leading constituent byte of a first instruction and a leading constituent byte of a second instruction are stored at mutually adjacent addresses;

the constituent bytes of the first instruction are stored in descending address order, the constituent bytes of the second instruction being stored in ascending address order;

an address pointer indicating the address of the leading constituent byte of the first or second instruction is provided;

an initial count value is set in the first address counter according to the address pointer, the constituent bytes of the first instruction are read in sequential order while the first address counter counts down, and the first instruction is executed; and another initial count value is set in the second address counter according to the address pointer, the constituent bytes of the second instruction are read in sequential order while the second address counter counts up, and the second instruction is executed.

3. The processor of claim 2, further comprising:

a first instruction register into which all constituent bytes of the first instruction are read;

a second instruction register into which all constituent bytes of the second instruction are read;

a first decoder for decoding and executing the instruction read into the first instruction register; and a second decoder for decoding and executing the instruction read into the second instruction register.

4. The processor of claim 2, further comprising:

a first instruction register into which all constituent bytes of the first instruction are read;

a second instruction register into which all constituent bytes of the second instruction are read;

a selector for selecting one of the first instruction register and the second instruction register; and a decoder for decoding and executing the instruction read into the instruction register selected by the selector.

5. The processor of claim 2, wherein the first and second instructions are read concurrently and executed concurrently.

6. The processor of claim 5, wherein at least one of the first instruction and the second instruction includes information indicating whether concurrent processing of the first and second instructions is possible; and the controller causes said concurrent processing to be performed when the information indicates that the concurrent processing is possible.

7. A processor comprising:

a first address counter for counting up;

a second address counter for counting down;

a third address counter for counting up;

a fourth address counter for counting down;

a memory unit storing a plurality of instructions, each instruction having a plurality of constituent bytes; and a controller controlling the first, second, third, and fourth address counters and the memory unit;

wherein each of said constituent bytes is stored at a separate address in the memory unit;

the constituent bytes of a first instruction are stored in ascending address order in a first address group consisting of consecutive addresses;

the constituent bytes of a second instruction are stored in descending address order in a second address group consisting of consecutive addresses;

the constituent bytes of a third instruction are stored in ascending address order in a third address group consisting of consecutive addresses;

the constituent bytes of a fourth instruction are stored in descending address order in a fourth address group consisting of consecutive addresses;

a leading constituent byte of the second instruction and a leading constituent byte of the third instruction are stored at mutually adjacent addresses;

a point instruction is disposed at an address immediately preceding the address of a leading constituent byte of the first instruction;

the point instruction includes a first internal address pointer indicating the address of the leading constituent byte of the second or third instruction, and a second internal address pointer indicating the address of a leading constituent byte of the fourth instruction;

a main address pointer indicating the address of the point instruction is provided;

execution of the point instruction generates the first and second internal address pointers;

a first initial count value is set in the first address counter according to the main address pointer, the constituent bytes of the first instruction are read in sequential order while the first address counter counts up, and the first instruction is executed;

a second initial count value is set in the second address counter according to the first internal address pointer, the constituent bytes of the second instruction are read in sequential order while the second address counter counts down, and the second instruction is executed;

a third initial count value is set in the third address counter according to the first internal address pointer, the constituent bytes of the third instruction are read in sequential order while the third address counter counts up, and the third instruction is executed; and a fourth initial count value is set in the fourth address counter according to the second internal address pointer, the constituent bytes of the fourth instruction are read in sequential order while the fourth address counter counts down, and the fourth instruction is executed.

8. A method of executing instructions using the processor of claim 1, the method comprising:

executing a branch instruction, thereby generating the address pointer indicating the address of the leading constituent byte of the first or second instruction, together with direction information indicating up or down;

executing the first instruction if the direction information indicates down, the controller causing the address counter to count down; and executing the second instruction if the direction information indicates up, the controller causing the address counter to count up.

9. A method of executing instructions using the processor of claim 7, the method comprising:

executing a branch instruction, thereby generating the main address pointer together with distance information indicating a distance from the address of the point instruction and direction information indicating up or down; and executing at least one of the first through fourth instructions according to the generated main address pointer, distance information, and direction information.

10. The method of claim 9, wherein executing at least one of the first through fourth instructions further comprises:

executing all of the first through fourth instructions if the distance information indicates a distance from the address of the point instruction to the address of the leading byte of the first instruction;

executing the second through fourth instructions if the distance information indicates a distance from the address of the point instruction to the address of the leading byte of the second or third instruction and the direction information indicates down;

executing the third and fourth instructions if the distance information indicates a distance from the address of the point instruction to the address of the leading byte of the second or third instruction and the direction information indicates up; and executing the fourth instruction alone if the distance information indicates a distance from the address of the point instruction to the address of the leading byte of the fourth instruction.

* * * * *